(12) United States Patent
Funge et al.

(10) Patent No.: US 10,200,436 B2
(45) Date of Patent: Feb. 5, 2019

(54) MEASURING USER QUALITY OF EXPERIENCE FOR A STREAMING MEDIA SERVICE

(71) Applicant: NETFLIX, INC., Los Gatos, CA (US)

(72) Inventors: John Funge, Sunnyvale, CA (US); Mark Watson, San Francisco, CA (US); Wei Wei, Fremont, CA (US); David Chen, San Francisco, CA (US)

(73) Assignee: NETFLIX, INC., Los Gatos, CA (US)

( * ) Notice: Subject to any disclaimer, the term of this patent is extended or adjusted under 35 U.S.C. 154(b) by 0 days.

(21) Appl. No.: 15/333,125

(22) Filed: Oct. 24, 2016

(65) Prior Publication Data

US 2017/0048297 A1    Feb. 16, 2017

Related U.S. Application Data

(63) Continuation of application No. 13/329,038, filed on Dec. 16, 2011, now Pat. No. 9,479,562.

(51) Int. Cl.
*H04L 29/06* (2006.01)
*H04N 21/442* (2011.01)
*H04L 12/26* (2006.01)
*H04L 29/08* (2006.01)

(52) U.S. Cl.
CPC ............ *H04L 65/80* (2013.01); *H04L 43/045* (2013.01); *H04L 67/322* (2013.01); *H04N 21/44218* (2013.01)

(58) Field of Classification Search
CPC ...................................................... H04L 65/80

USPC .......................................................... 709/224
See application file for complete search history.

(56) References Cited

U.S. PATENT DOCUMENTS

| 2009/0034426 | A1 | 2/2009 | Luft et al. | |
| 2012/0311126 | A1* | 12/2012 | Jadallah | H04L 41/5067 709/224 |
| 2013/0041998 | A1* | 2/2013 | Kordasiewicz | H04H 60/33 709/224 |

OTHER PUBLICATIONS

"A Study on a QoS/QoE Correlation Model for QoE Evaluation on IPTV Service", Hyun Jong Kim, et. al., pp. 1377-1382, Feb. 10, 2010, http://ieeexplore.ieee.org/stamp/stamp.jsp?tp=&arnumber=5440288.*

* cited by examiner

*Primary Examiner* — Suraj M Joshi
(74) *Attorney, Agent, or Firm* — Artegis Law Group, LLP

(57) ABSTRACT

Techniques are disclosed for representing a user quality of experience (QoE) experienced by users of a streaming media service using a single QoE metric. The single QoE metric may be determined based on a set of empirical characteristics relating to the streaming video service such as startup latency, video quality, and the likelihood of interruptions in streaming playback. The empirical characteristics may be weighted according to how much one factor influences user quality of experience, relative to the others. Representing the QoE as a single metric may allow a streaming media service provider to improve key business measures such as subscriber retention and engagement.

23 Claims, 7 Drawing Sheets

MEASURING USER QUALITY OF EXPERIENCE FOR A STREAMING MEDIA SERVICE

CROSS-REFERENCE TO RELATED APPLICATIONS

This application is a continuation of the co-pending U.S. patent application titled, "MEASURING USER QUALITY OF EXPERIENCE FOR A STREAMING MEDIA SERVICE," filed on Dec. 16, 2011 and having Ser. No. 13/329,038. The subject matter of this related application is hereby incorporated herein by reference.

BACKGROUND OF THE INVENTION

Field of the Invention

Embodiments of the invention generally relate to streaming media services. More specifically, embodiments of the invention relate to techniques for determining and improving user quality of experience, as measured relative to a single quality of experience metric.

Description of the Related Art

A user's quality of experience watching streaming video depends on many factors. For example, factors that may influence user experience include the time to start video playback, the quality of the audio/video presented (initially and averaged over time), the time required to reach a stable video quality level, the amount (and frequency) of quality level switching, the number of times video playback has to pause in order to re-buffer, the time required to recover following a re-buffer, etc. Further, the context in which streaming video content is viewed can change what influences a user's quality of experience. For example, a fast startup time for a video presented at a lower quality may lead to a good user experience for content streamed on a mobile device (as opposed to waiting long periods for buffering, or having frequent changes in video quality). In contrast, presenting a user with a low-quality video, even one that starts quickly, may lead to a poor user experience for a user watching the same streaming video content at home on a high-definition television. In such a case, fast startup times may be far less important to the latter user's overall quality of experience than consistent, high-quality video.

As this relatively simple example illustrates, a wide variety of factors may impact the overall quality of experience for a viewer consuming streaming video content. However, even independent of viewing context, improving one metric frequently comes at the expense of another. For example, one way to optimize video startup time is to start streaming content with a lower quality bit rate. Doing so improves startup time, but does so at the expense of initial stream quality. The quality of the video is then increased as available bandwidth will allow. Another way to optimize startup time is to carefully manage the timing of initial data download and decoding, but this may increase the chance of needing to re-buffer the video at the start of user's viewing session. More generally, given the wide and frequently conflicting settings for video streaming (both at the client and server), it is generally unclear what changes will tend to result in an improved overall viewing experience.

SUMMARY OF THE INVENTION

One embodiment of the present invention includes a computer-implemented method for deriving a single quality of experience (QoE) metric for the experience provided to users of a streaming video service. This method may generally include sampling one or more characteristics of the streaming video service while streaming media content to one or more of users and determining, for each of the one or more sampled characteristic, a numerical contribution to the single (QoE) metric. This method also includes determining one or more combination functions to use to evaluate each of the one or more sampled characteristics contribution to the single QoE metric. The combination functions are selected to correlate computed values of the single QoE metric with at least one performance metric associated with the streaming video service.

Examples of combination functions include assigning a weighting factor to each of the plurality of characteristics. Examples of the performance metric include a measure of hours watched by the users of the streaming video service and a level of subscriber retention for the users of the streaming video service, but could be other key business metrics as well. The characteristics of the streaming video service may include, among others, streaming video startup latency, initial video quality, average video quality, a probability of a buffer under run occurring, and a frequency of changes in a bit rate at which streaming video is delivered to a client device.

In a particular embodiment, the method may also include monitoring the computed value of the QoE metric while streaming video content to one of the plurality of users and, upon determining the computed value of the QoE has degraded below a specified threshold, performing one or more corrective actions to improve a subsequently computed value of the single QoE metric.

Other embodiments include, without limitation, a computer-readable medium that includes instructions that enable a processing unit to implement one or more aspects of the disclosed methods as well as a system configured to implement one or more aspects of the disclosed methods.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
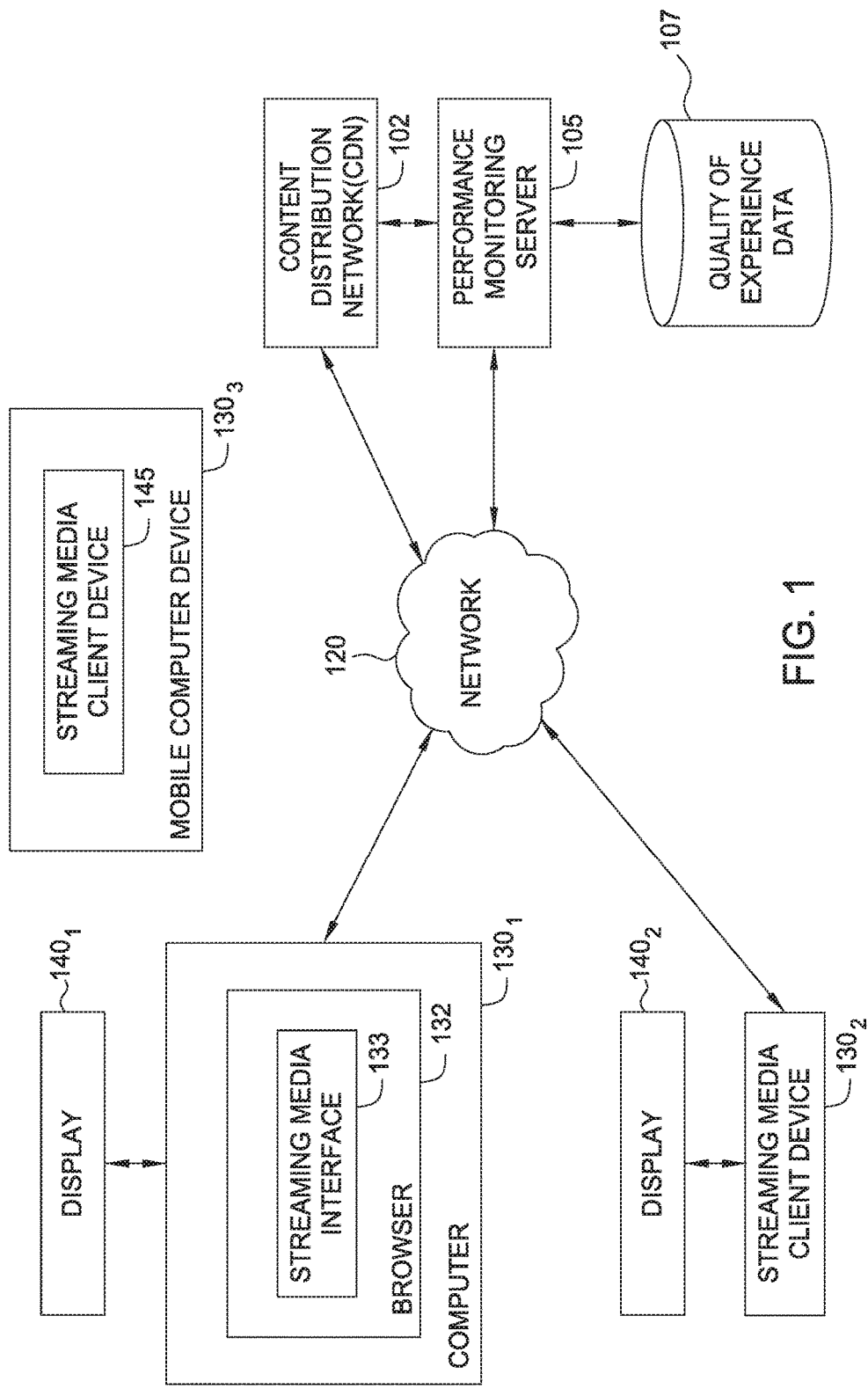
FIG. 1 illustrates a computing infrastructure configured to provide streaming media content to a variety of client devices, according to one embodiment of the invention.

Embodiments of the invention provide techniques for a streaming media service provider to evaluate the quality of user's experience in accessing a streaming media service. Doing so may allow the service provider to improve subscriber retention and engagement. In one embodiment, a variety of performance characteristics are sampled to determine a single quality of experience metric for a streaming video service. For example, consider the following function for measuring user quality of experience:

$$QoE = f(\text{re-buffering count, bit rate, startup time, ...})$$

This represents a single, overall metric for user quality of experience (QoE) determined as a function of the factors affecting quality of experience. In one embodiment, the QoE function may be calculated as a linear combination of these (and/or other) relevant factors yielding a metric that is a single numerical value. Of course, other statistical approaches could be used as well. In particular, a single QoE metric may comprise multiple numerical values, provided a partial ordering exists based on which, given two metric values, it is possible to determine which represents the better user experience.

One such example is where the output of the combination function is a pair (N, R) where N is a number and R is a Boolean. R is true if there was rebuffering and N is a numeric quality metric and all pairs with R=true are ordered below all pairs with R=False and (N1, R)<(N2, R) if and only if N1<N2.

More generally, values for the coefficients may be determined that maximize a correlation between a single QOE metric determined from a set of streaming characteristics (such as bit rate, startup time, and re-buffering, etc.) and key business measures (such as retention, churn, and hours watched, etc.). For example, using the factors mentioned above yields:

$$QoE = (\lambda_1 M + \lambda_2 BR + \lambda_3 S + \ldots)$$

Where M represents a probability of re-buffering, BR represents streaming media bit rate, and where S represents startup latency for streaming video. Values for M, BR and S can be obtained using historical data generated while streaming media content to users or from monitoring a user while consuming streaming media content. It remains however, to determine the values for the coefficients ($\lambda_1$, $\lambda_2$, $\lambda_3$) that lead to the best overall quality of experience for users, i.e., to determine how much one factor influences user quality of experience, relative to the others, as well as to determine how much the resulting overall single metric QoE correlates to observations of key business measures (e.g., "hours watched," retention, and churn).

Embodiments of the invention provide techniques for determining these weights empirically by correlating levels of user engagement (represented using "hours watched") with different values for ($\lambda_1$, $\lambda_2$, $\lambda_3$ ...). In one embodiment, users may be assigned to different test cells in order to evaluate different tradeoffs in performance of the streaming video service. Trying out different possibilities in different test cells allows coefficients to be chosen that are empirically determined to correlate with key business measures such as "hours watched" for users in each test cell. Note, doing so assumes that users who have a higher overall quality of experience will consume more content from the streaming media service and as a result be less likely to cancel their membership of the service, i.e., that "hours watched" is a good proxy for retention.

The behavior of the streaming service may vary among the test cells. For example, one test cell may always begin video playback at the lowest quality stream available and then "ramp up" as a network bandwidth allows. In another test cell, video streaming could start using higher quality video, but at the expense of higher start time latency. By determining values for the weights for each test cell that correlate to "hours watched" for users assigned to the different test cells, the different choices in the behavior streaming the behavior of the streaming service may be evaluated.

More generally, values for the coefficients may be determined that maximize a correlation between a single QOE metric determined from a set of streaming characteristics (such as bit rate, startup time, and re-buffering, etc.) and key business measures (such as retention, churn, and hours watched, etc.).

Further, while users could be assigned at random to different test cells, such as in the case of A/B testing, in one embodiment, users may be assigned to test cells based on characteristics of the device (or class of device) used to access the streaming service (e.g., mobile device versus web-browser and PC, versus home theater device), characteristics of the network used to access the streaming service (e.g., ISP or geographical region of the user), characteristics of the content (e.g. cartoon content versus live action vs sports) or any other suitable characteristics. Doing so allows the single metric of QoE to be tied to particular devices (or class of devices) or with other factors That is, different single metric QoE weights may be determined to account for different viewing contexts (e.g., users viewing content on mobile phones versus home theatre devices).

In addition to evaluating the impact of different underlying streaming video performance characteristics, the single metric for QoE may be used to monitor the current quality of experience being provided to a user (or group of users) allowing dynamic changes being made in order improve user experience. Further, when a user initially requests to consume streaming media content, configuration settings for the playback of video may be selected that should maximize the quality of experience for that user (or class of user). Further still, should any relevant conditions change while a user is streaming media content, then the configuration settings might be changed to help improve the overall quality of experience, as measured by the single metric QoE.

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Further, particular embodiments of the invention are described using an example of a web browser running on a personal computer being used to stream movies, music, television programming, etc., over a data communications network. However, it should be understood that the invention may be adapted to for streaming video service accessed using a broad variety of network aware/capable consumer electronics devices such as DVD players, Blu-ray® players, web-based interfaces, set-top boxes, mobile telephones, game platforms, portable music players, home media systems, etc. Accordingly, references to a streaming media client executed by a web browser are included to be illustrative and not limiting.

FIG. 1 illustrates a computing infrastructure 100 configured to provide streaming media content to a variety of client devices 130, according to one embodiment of the invention. As shown, the computing infrastructure 100 includes a content distribution network (CDN) 102, a performance monitoring server 105, and a plurality of client devices $130_{1-3}$, each connected to a communications network 120.

The client systems $130_{1-3}$ communicate with the streaming media server system 105 over the network 120 to download streaming media titles. In this particular example, client system $130_1$ represents a computer system running a web-browser 132. Accordingly, client system $130_1$ is representative of desktop PCs, laptop computers, home-theater PCs (HTPCs), tablet computers, gaming consoles and other computing systems capable of running a web-browser. The web-browser 132 is configured to obtain a streaming media interface 133 from the streaming media server 105, rendered on a display $140_1$, e.g., an LCD monitor.

In one embodiment, the streaming media interface 133 provides an interface used to access streaming media content available from the CDN 102. The CDN 102 itself may provide the appropriate computing servers configured to provide clients 130 with access to a library of streaming media titles. For example, CDN 102 may include computing systems running a web-server, database and application server configured to respond to requests for web pages and/or streaming media files received from web-browser 132, from streaming media client device $130_2$ or streaming media client 145 on mobile computing service $130_3$. For example, in one embodiment, the streaming media server 105 allows a viewer to authenticate themselves to the streaming media service provider (e.g., using a username and password) by interacting with the interface on one of the client devices $130_{1-3}$. Once a given viewer is authenticated, the user may select and view titles from the library available from the streaming media service provider.

Client system $130_2$ represents a set-top device connected to both network 120 and a display 140 (e.g., a flat-panel television). Accordingly, client system $130_2$ is representative of digital cable boxes, digital video recorder (DVR) systems, video game consoles, and other streaming media devices, as well as DVD players capable of connecting to a network 120 and receiving and playing back media streams provided by media server 105. For example, some Blu-ray® disc players can download and execute BD-live applications. In such a case, the disc player could connect to the media server 105 and download interface components used to select and playback media streams. Further, display 140 may itself be an integrated device capable of connecting to the network 120 playing back media streams supplied by the media server 105. For example, some flat-panel television displays include integrated components used to connect to a streaming media service, video on demand services, or video sharing websites. Client system $130_3$ represents a mobile computing device, such as mobile telephone, tablet or net book, which includes a dedicated application used to access the CDN 102 of a streaming media service.

The performance monitoring server 105 may assign client devices $130_{1-3}$ to test groups used to derive to a single quality of experience (QoE) metric for the streaming media service provider. As noted, by assigning users to test cells having different streaming characteristics, the relative impact of different streaming characteristics may be determined. For example, test cells may compare the impact of video start up time (latency) versus initial video quality on overall user experience (as measured by "hours watched" or other proxy for user engagement). As another example, test cells could compare the impact of higher video quality against a higher likelihood of re-buffering occurring. Still another test cell may assign users and measure engagement relative to whatever prevailing conditions occurred during a viewing sessions. That is, some test cells may not be part of A/B testing, but instead measure the streaming characteristics experienced by a user while viewing streaming media content. Like test cells for A/B tests, such undirected test cells may be segmented by user type, device, class of device, or other relevant characteristics. Alternatively individual user viewing sessions may be assigned to test cells at the start of each session, in order to average over user characteristics. The definition of test cells, streaming configurations, and relative weights used to calculate the single QoE metric may be stored as quality of experience data 107. Once a set of weights capturing the relative importance of different streaming characteristics are determined, the single QoE metric may be used to configure streaming sessions in order to optimize viewers' overall quality of experience in using the streaming service.

Figure 2:
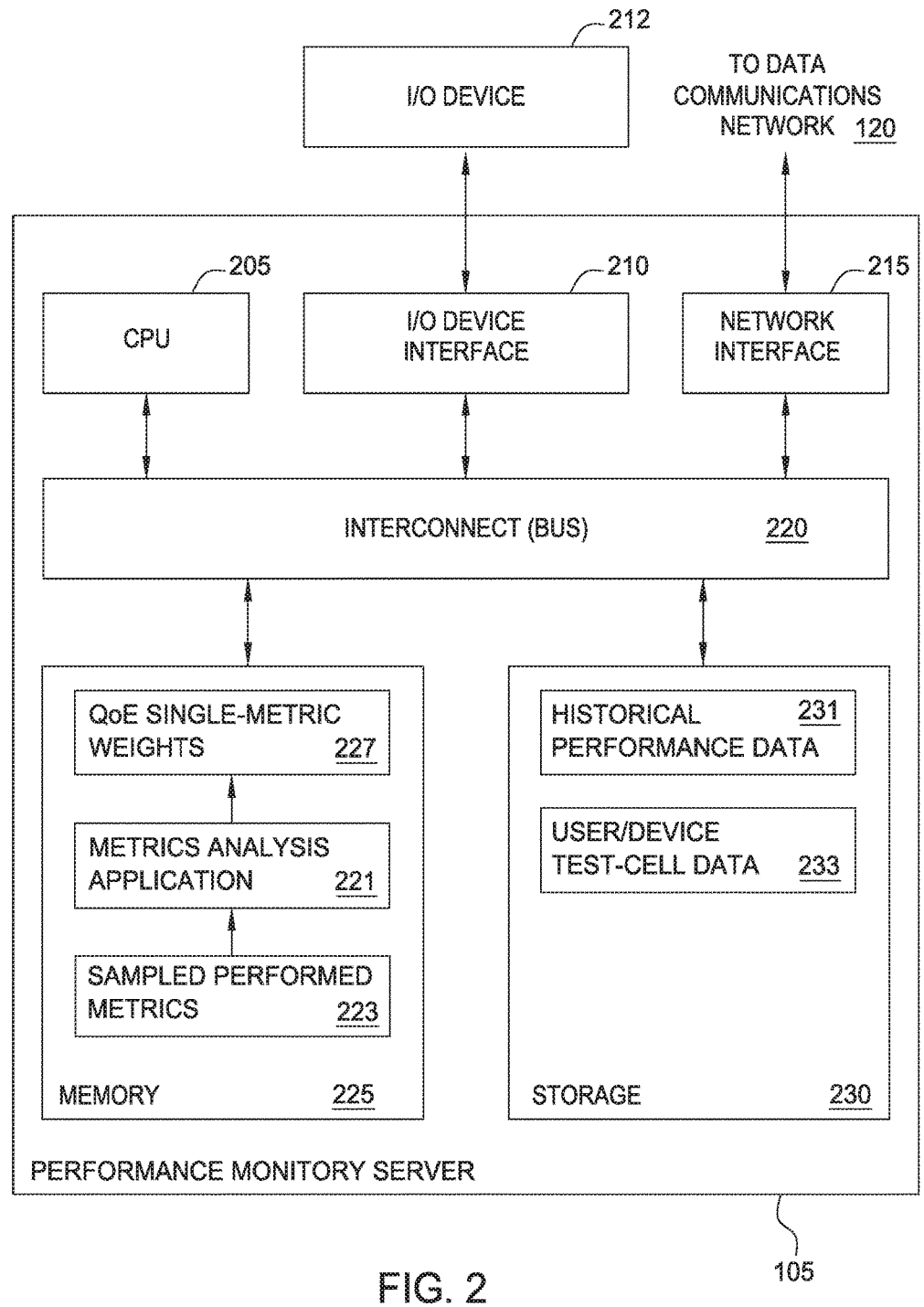
FIG. 2 further illustrates the performance monitoring server first shown in FIG. 1, according to one embodiment of the invention.

FIG. 2 further illustrates the performance monitoring server 105 first shown in FIG. 1, according to one embodiment of the invention. As shown, the server computing system 105 includes, without limitation, a central processing unit (CPU) 205, a network interface 215, an interconnect 220, a memory 225, and storage 230. The content server 105 may also include an I/O devices interface 210 (e.g., keyboard, display and mouse devices).

The CPU 205 retrieves and executes programming instructions stored in the memory 225. Similarly, the CPU 205 stores and retrieves application data residing in the memory 225. The interconnect 220 facilitates transmission, such as of programming instructions and application data, between the CPU 205, I/O devices interface 210, storage 230, network interface 215, and memory 225. CPU 205 is included to be representative of a single CPU, multiple CPUs, a single CPU having multiple processing cores, and the like. And the memory 225 is generally included to be representative of a random access memory. The storage 230 may be a disk drive storage device. Although shown as a single unit, the storage 230 may be a combination of fixed and/or removable storage devices, such as fixed disc drives, removable memory cards, solid state (SSD) storage devices, or optical storage, network attached storage (NAS), or a storage area-network (SAN) accessed over a network.

Illustratively, the memory 225 includes a metrics analysis application 221, streaming performance characteristics 223 and single metric QoE weights 227. And storage 230 includes historical performance data 231 and user/device test cell data 233. In one embodiment, the metrics analysis application 221 provides software configured to assign client devices 130 to different test cells and to monitor streaming characteristics experienced by devices assigned to a given test cell. The metrics analysis application 221 may be further configured to evaluate the observed streaming performance (represented as sampled performance metrics 223) to derive a measure for a single QoE metric for evaluating the overall QoE being provided to users of the streaming media service. For example, the metrics analysis application 221 may be configured to determine single metric QoE weights 227 used to calculate the single metric QoE as a linear combination of underlying performance characteristics. As noted, examples of factors that may impact a user's overall quality of experience include the time required start video playback, the quality of the audio/video presented (initially and averaged over time), the time required to reach a stable video quality level, the amount (and frequency) of quality level switching, the number of times video playback has to pause in order to re-buffer, the time required to recover following a re-buffer, etc.

The test cells to which a client device is assigned may be stored in user/device test cell data 233. For example the metrics analysis application may use an electronic serial number (ESN) or other identifying information for a given client device in order to determine which test cell 233 the specific client device has been assigned. The test cells may be configured to measure variations for configuring a streaming service, as in the case of an A/B test. Devices may also be assigned to test cells (whether or not as part of an A/B test) by class of device, class of user, class of network, etc., or using any other suitable criteria.

Historical performance data 231 may be configured to store the performance metrics experienced by a client device captured while a user consumes streaming media content. For example, a client device may be configured to adaptively select a bit rate used to stream media content from a CDN based on the prevailing network conditions experienced by that client device (or such selections may be made by the CDN in streaming content to the client device). In such cases, the performance data 231 may record each such change in bit rate. Similarly, if a buffer under-run occurs on a client device leading to a pause in video playback and re-buffering, such an event may be stored in the performance data 231. More generally, the historical performance data 231 may record data corresponding to the performance characteristics used to derive the measure for the QoE single metric for the video streaming service. In addition, the historical performance data 321 may also store data used to correlate the observed streaming video characteristics with measures of user engagement, e.g., retention or "hours watched" by each user. By correlating the measures of user engagement with the different recorded values of streaming media characteristics, the metrics analysis application 221 may derive weights used to calculate a single QoE value suing the single metric weights 227 and observed streaming performance.

Further, once the measure for the single QoE metric is determined, the resulting measure may be used to improve the quality of experience for uses of the streaming video service. For example, assume a single QoE measure is determined for a device class representing mobile devices—in such a case, when users connect to the service using a mobile device—configuration settings for video quality, startup latency, may be optimized for such a device. Further, the current value for the single QoE metric may be monitored while a user consumes streaming media content (either by the client device while streaming or by the streaming media provider). In such a case, if the measured value for the QoE metric falls below a threshold, different changes in the current streaming configuration may be evaluated to predict the estimated improvement to the computed value for the QoE metric.

Figure 3:
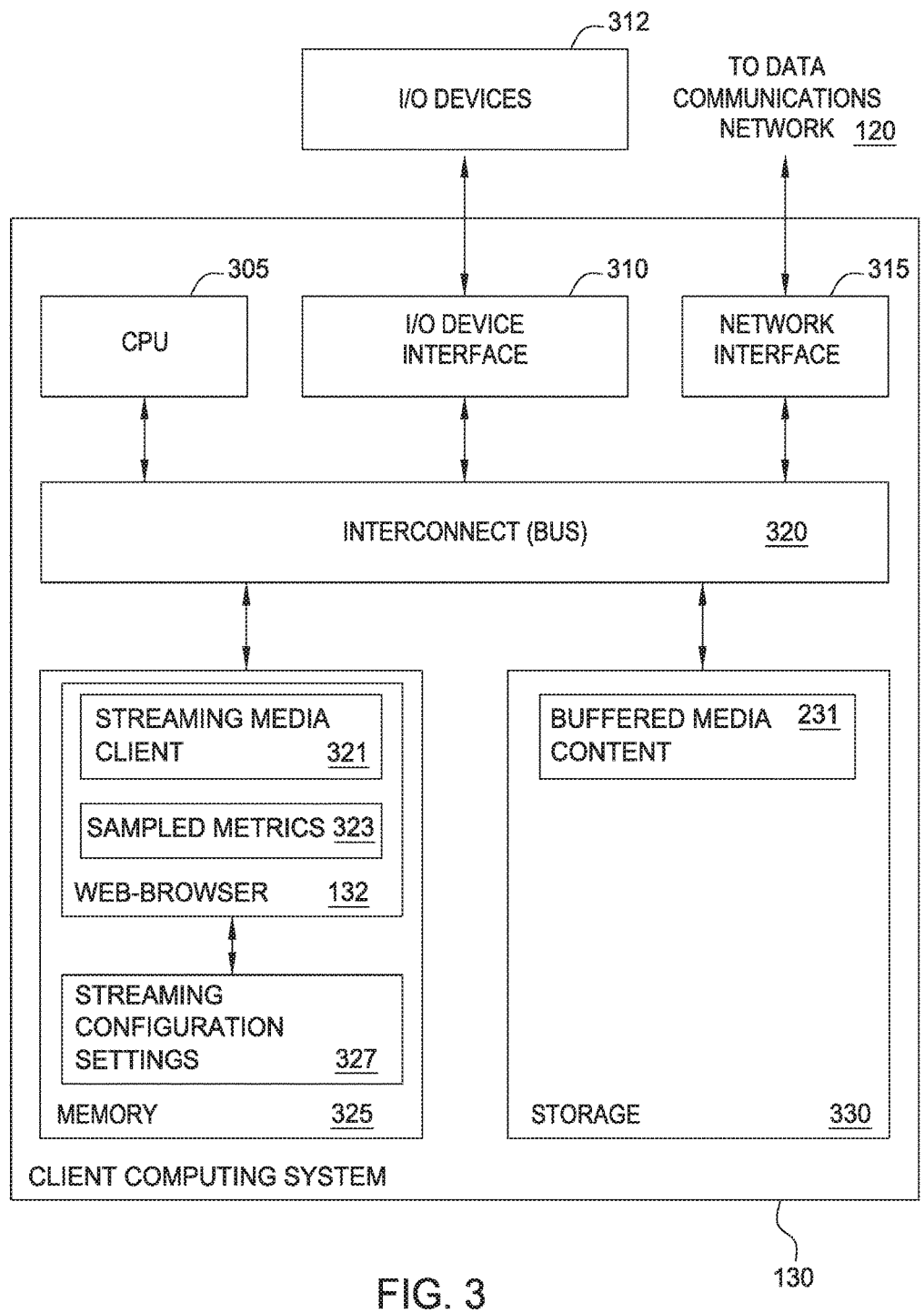
FIG. 3 further illustrates an example of the client computing system first shown in FIG. 1, according to one embodiment of the invention.

FIG. 3 illustrates an example of a client computing system $130_1$ used to view streaming media content, according to one embodiment of the invention. As shown, the client computing system $130_1$ includes, without limitation, a central processing unit (CPU) 305, a network interface 315, a bus 320, a memory 325, and storage 330. The computing system $130_1$ also includes an I/O device interface 310 connecting I/O devices 312 to the computing system $130_1$ (e.g., a keyboard, mouse, or remote control, along with a monitor (e.g., an LCD panel).

Like CPU 205, CPU 305 is included to be representative of a single CPU, multiple CPUs, a single CPU having multiple processing cores, etc., and the memory 325 is included to be representative of a random access memory. The bus 320 connects CPU 305, I/O devices interface 310, storage 330, network interface 315 and memory 325. The network interface 315 is configured to transmit data via the communications network, e.g., to stream media from the server system 105. Storage 330, such as a hard disk drive or solid-state (SSD) storage drive, may store audio video data files along with other content. Other client devices may include similar computing hardware such as a microprocessor used on a mobile telephone or computing tablet or control logic in a consumer electronics device (e.g., a DVD player or dedicated set-top device) configured to execute firmware applications to access a streaming media service.

Illustratively, the memory 325 includes a web browser 132, which itself includes a streaming media client 321, and streaming configuration settings 327, and the storage 330 stores buffered media content 335. The browser 132 provides a software application which allows a user to access web pages and other content over a network. In context of the present disclosure, the streaming media client 321 generally corresponds to software components retrieved from a streaming media service in order to download and playback media content from that streaming media service. Content downloaded from the streaming media service may be stored in storage 330 (represented as buffered media content 335) prior to being decoded and played back by streaming media client 321.

The streaming media client 321 may provide a user interface which allows a user to select and playback titles available from the streaming media service. For example, the user may interact with the interface of the streaming media client 321 to search for a title to view using keywords or to select a title by scrolling through a list of titles or box shots). Once title is selected, the user may begin streaming content. In one embodiment, the client 321 may determine sampled metrics 323 to report to the performance server 105. The sampled metrics 321 generally correspond to streaming performance characteristics related to user quality of experience. For example, the client 321 may record changes in bit rate, playback startup times, buffer utilization, etc. Other sampled characteristics include a probability of a buffer under-run occurring over a given period, the time required to reach a specified video quality, the duration of any rebuffer events, and a distribution of rebuffer events (i.e., the mean time between rebufferring).

Additionally, streaming configuration settings 327 may be used to optimize the quality of experience for a user consuming streaming media content or specify settings for aspects of streaming content related to an A/B (or other) test being conducted to determine a measure for a single metric QoE.

Once determined, in one embodiment, the approach for video startup, adaptive bitrates, buffer management used for a streaming session may be tailored to maximize the single metric QoE. For example, configuration settings 327 may be set in advance to optimize the single metric QoE for a streaming experience for a given user type, device, class of device, etc. Further, if the streaming media client (or server) determines that an observed measure of the single metric QoE degrades below a specified threshold during a streaming session, the client 321 (or server) may determine changes to the configuration settings 327 that should improve the single metric QoE.

Figure 4:
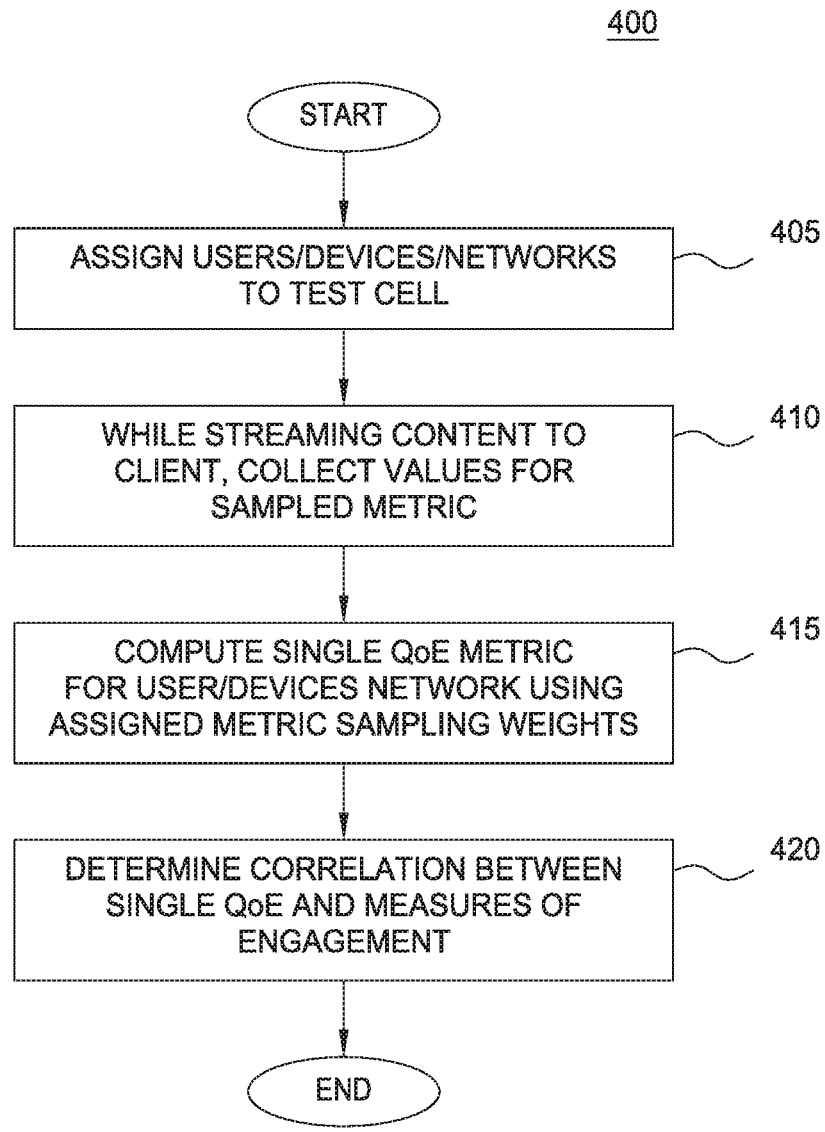
FIG. 4 illustrates a method for determining a single QoE metric from a set of streaming media performance characteristics, according to one embodiment of the invention.

FIG. 4 illustrates a method 400 for determining a set of weights for determining a single QoE metric related to a set of streaming media performance characteristics, according to one embodiment of the invention. That is, FIG. 4 uses an approach where the combination function determines a numerical weight to assign to the sampled characteristics of the streaming video service. Once determined, the single QoE metric may be determined as a linear combination of the sampled of the sampled characteristics and the weights. As noted above, other combination functions can be used, e.g., the output of the combination function could provide a pair (N, R) where N is a number and R is a Boolean. R could be set to true if a rebuffering occurred during a specified time and N is a numeric quality metric used to improve or degrade the contribution made to the single metric QoE made by the monitored performance.

As shown, the method 400 begins at step 405, where groups of test cells are defined and users, devices, and/or networks, are assigned to the test cells. Note, a user associated with one subscription to a streaming media service may be in multiple test cells. For example, a user may access a streaming media service using multiple devices, such as mobile telephone and home PC.

At step 410, while streaming media content to a client, values for streaming media characteristics relevant to a user's quality of experience may be sampled. The sampling itself may be performed by the client (e.g., in counting buffer under runs or startup latency) or by the CDN server (e.g., in response to determining to a change in the bit rate being streamed to a given client), and combinations of both. Approaches for collecting sampled performance data relevant to the single metric QoE include a "push" approach where the client sends data to the performance server, a "pull" approach where the performance server periodically requests certain sampled metrics be reported, an event driven approach where the occurrence of an event generates a report (or request) for a sampled performance metric value, as well as combinations of these approaches.

At step 415, the sampled performance data may be used to begin determining a single metric QoE for the device, device type, user, etc. For example, as noted above, the Single Metric QoE may be determined as a linear combination of the streaming network characteristics, such as the following:

$$QoE = (\lambda_1 M + \lambda_2 BR + \lambda_3 S + \ldots)$$

Where M represents a probability of re-buffering, BR represents streaming media bit rate, and where S represents startup latency for streaming video. Using this approach, in addition to determining the weights for the $\lambda_1$, $\lambda_2$ and $\lambda_3$ values, the contribution for an observed M, BR, and S values to the overall QoE needs to be determined.

In such an embodiment, numerical contributions may be assigned for values observed for each streaming media characteristic. For example, the streaming media service provider may make the assumption that the contribution to an overall quality of experience by one of the streaming media characteristic may be represented using a sigmoid curve function. In such a case, points along a sigmoid curve may be selected to represent different observed values for the streaming media characteristics. This approach is shown in FIGS. 5A-5C, which illustrate examples of streaming media performance characteristics sampled as part of determining a single QoE metric for a streaming video service, according to one embodiment of the invention.

Figure 5A:
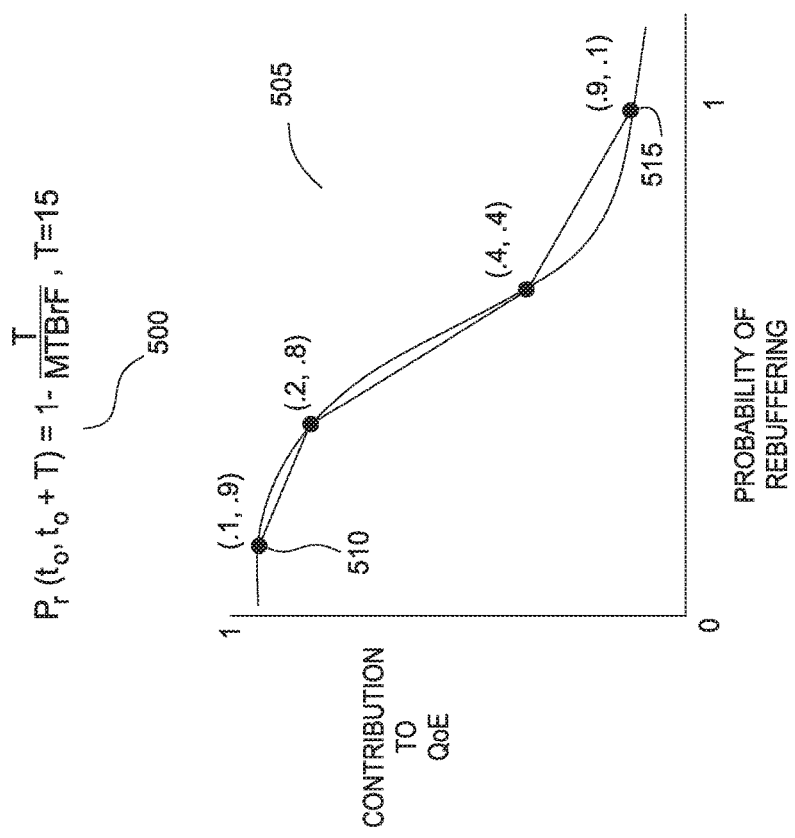
FIGS. 5A-5C, illustrate examples of streaming media performance characteristics sampled as part of determining a single quality of experience metric for a streaming video service, according to one embodiment of the invention.

First, FIG. 5A shows a contribution of M to QoE as a function of the probability of re-buffering. In this example, a graph 505 shows points along a sigmoid curve representing the probability of re-buffering and corresponding contribution to overall QoE. As shown at point 510, a low probability of re-buffering results in a correspondingly high contribution to QoE being made. In this example, a 0.1 (i.e., 10%) probability of re-buffering results in a 0.9 contribution to overall QoE (as later weighted by $\lambda_1$). Conversely, a high probability of re-buffering results in a correspondingly low contribution to QoE being made. In this example, a 0.9 (or 90%) probability of re-buffering results in a 0.1 contribution to overall QoE (also as later weighed by $\lambda_1$). Thus, a low probability of re-buffering helps maintain a high overall QoE, while a high probability may greatly reduce QoE, (depending on the weight for $\lambda_1$). Contributions to the overall QoE for a re-buffering probability between points 510 and 515 may be determined based on the sigmoid curve shown in graph 505.

FIG. 5A also shows an equation for determining the probability of re-buffering as a function of an observed the mean time between re-buffering (MTBRF). In this example, the probability $P_r$ of a re-buffering event between time $t_0$ and time $t_0+T$ is determined using equation 500. While any value for T may be used, experience has proven setting T equal to 15 minutes has achieved produced good results, at least in some cases. Further, other approaches may be used to determine the probability $P_r$ other than the equation 500.

Figure 5B:
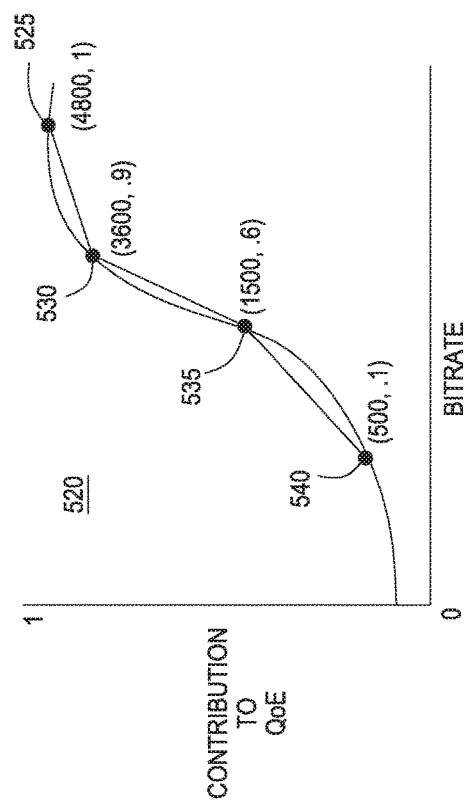
Figure 5C:
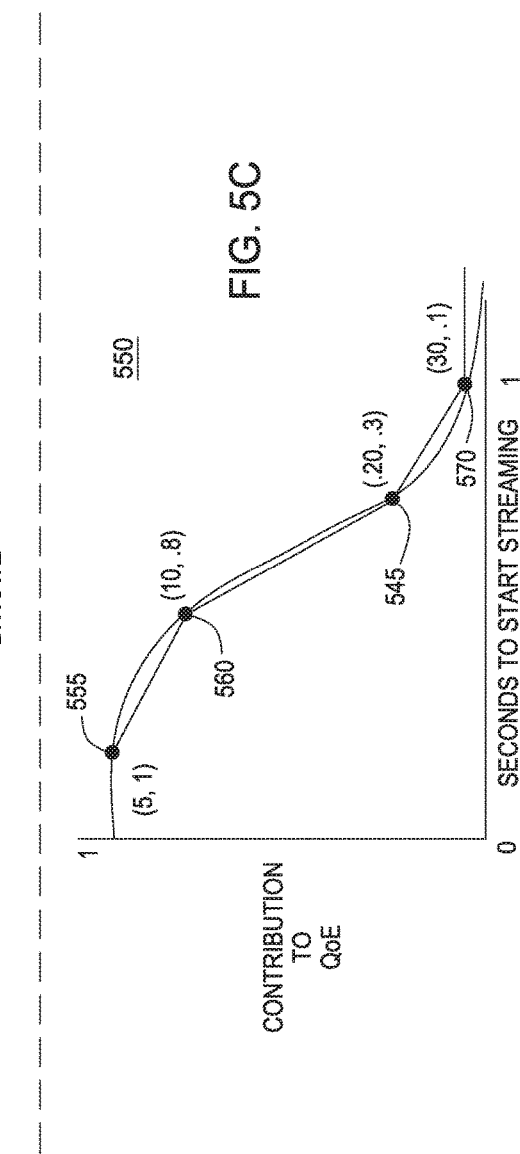

FIG. 5B illustrates a graph 520, which shows an example for determining a contribution to QoE based on the bit rate of streaming video delivered to a client. In this example, a graph 520 shows points on a sigmoid curve representing a set of available streaming bitrates and shows a corresponding contribution to overall QoE for each bit rate. Specifically, the points 525, 530, 535 and 540 correspond to streaming media bitrates of 4800 kbps, 3600 kbps, 1500 kbps, and 500 kbps, respectively. In this example, a high bit rate helps maintain a high overall QoE with a contribution of 1.0, while a low bit rate results may greatly reduce QoE as in the case of a 500 kbps depending on a weight for $\lambda_2$.

FIG. 5C illustrates a graph 550, which shows an example for determining a contribution to QoE based on the startup latency S for beginning streaming video playback. In this example, the graph 550 shows points on a sigmoid curve representing a contribution to overall QoE for startup time as a function of the time required to start streaming video. Specifically, the points 555, 560, 565 and 570 correspond to streaming media startup times of 5, 10, 20, and 30 seconds, respectively. In this example, fast startup time helps maintain a high overall QoE. For example, 5 seconds corresponds to a QoE contribution of 1, while a slightly slower startup time between 5 and 10 seconds only reduces the QoE contribution to 0.8. The QoE contribution than rapidly falls to 0.3 for a startup time of 20 seconds, but the degradation in QoE then levels off for startup times up to 30 seconds (with a contribution of 0.1). The resulting QoE contribution may then scaled by a weight for $\lambda_3$, to determine the overall impact of startup time on the single metric QoE.

Figure 6:
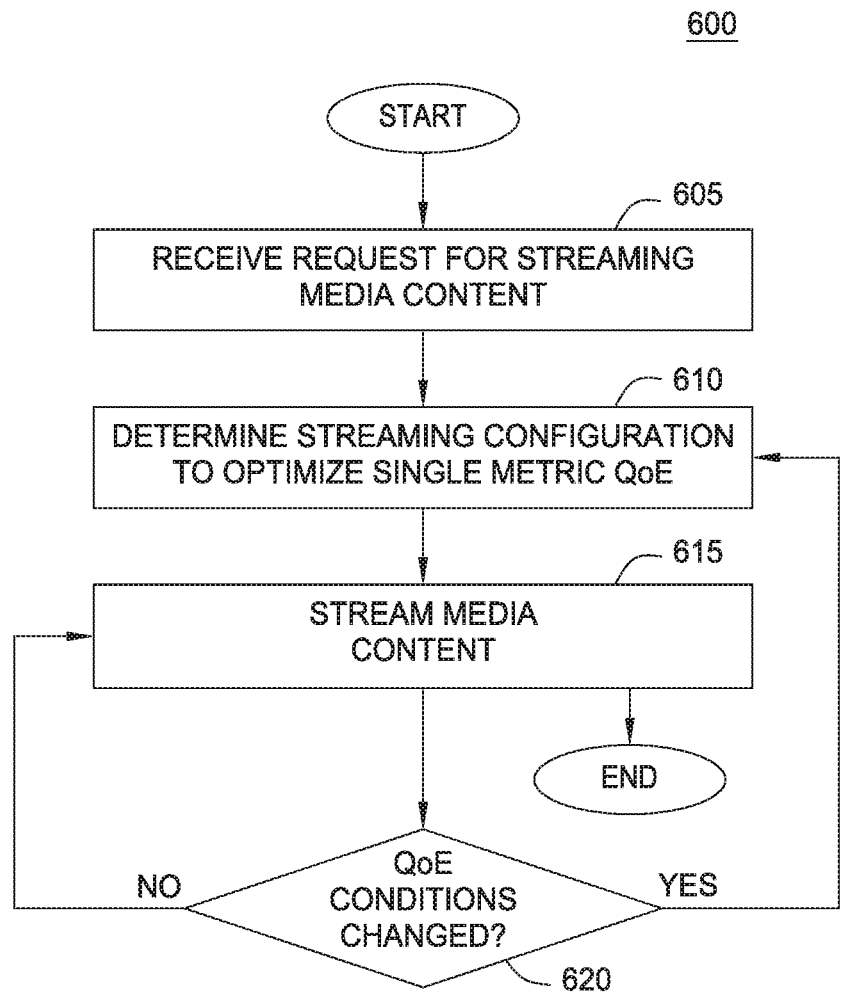
FIG. 6 illustrates a method for streaming content to a client device, while also optimizing the single quality of experience metric, according to one embodiment of the invention.

Referring again to the method 400 of FIG. 4, at step 420, the values for weights $\lambda_1$, $\lambda_2$, and $\lambda_3$ may be determined. For example, in one embodiment, the weights are assigned in order to correlate the resulting single metric QoE determined from the weights and the sampled streaming performance metric values with observations of key business measures (e.g., by correlating the single metric QoE values for "hours watched" or subscriber retention). Correlating the single metric QoE with such key business metrics allows the streaming media provider to optimize the streaming media experience for users in a manner that should improve these key business measurers. For example, FIG. 6 illustrates a method 600 for streaming content to a client device while also optimizing the single quality of experience metric, according to one embodiment of the invention.

As shown, the method 600 begins at step 605, where a streaming media service provider receives a request to begin streaming some item of media content to a client device. A measure for a single metric QoE may have been derived for different devices, classes of devices, user types, etc., using the approaches described herein.

For example, assume a user requests to begin streaming media content on a mobile phone or portable tablet computing device and that a single measure of QoE has been determined with weights which favors low startup latency over higher initial video bitrates and favors lower overall bitrates over a greater risk of a buffer under run. In such a case the streaming media client device could be configured with streaming media parameters that optimize the single metric QoE for devices of this device type; namely, an adaptive streaming approach could be used for the device that favors faster start times for video playback (e.g., using the lowest available bit rate) and makes conservative adaptive streaming decisions to minimize the risk of buffer under runs.

Now assume the same user accesses the streaming media service from home (e.g., to continue watching the same title the user began watching on the mobile device). In this case, a device used to watch streaming media content on a high definition television could be configured with streaming media parameters that optimize the single metric QoE for streaming media to a user's home. Thus, an adaptive streaming approach might favor slower start times in order to always present high definition video. Further, the user might be more tolerant to a risk of buffer under run when streaming over a home network (where the risk may be low in general) then on a mobile device (where the risk is much may be much higher) and less tolerant to frequent changes in video quality. Accordingly, the device could be configured to more aggressively present higher bit-rate video, at the experience of increased risks of buffer under runs.

At step 615, once configured the client streams media content decoded and presented to the user on a display. At step 620, if a computation of the single metric QoE has degraded below a specified threshold, then the settings for streaming media to the client may be evaluated to see if changes might improve the computed value of the single metric QoE. Further, in addition to monitoring the single metric QoE determined for a specific client device while media content is streamed to that device, in one embodiment, the streaming media service provider may monitor an aggregate of the single metric QoE provided to groups of users. In such a case, if the aggregate QoE being provided to a group of user falls, then the streaming media service provider can be alerted to a reduction in overall service quality being experienced by many users.

In sum, techniques are disclosed for determining a measure for a single metric QoE based on a set of characteristics relating to the streaming video service. Doing so may allow a streaming media service provider to improve subscriber retention and engagement.

While the forgoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

In view of the foregoing, the scope of the present invention is determined by the claims that follow.

We claim:
1. A computer-implemented method, comprising:
    sampling a plurality of performance characteristics associated with a streaming video service while streaming media content to one or more users;
    for each performance characteristic included in the plurality of performance characteristics, determining a numerical contribution that the performance characteristic makes to a single quality of experience (QoE) metric for the streaming video service;
    determining, for each performance characteristic included in the plurality of performance characteristics, a weight corresponding to the performance characteristic;
    computing the single QoE metric by applying, for each performance characteristic included in the plurality of performance characteristics, the weight corresponding to the performance characteristic to the numerical contribution determined for the performance characteristic, wherein each weight is determined to increase a correlation between the single QoE metric and a measure of a level with which the one or more users are engaged with the streaming video service; and
    updating at least one configuration setting for the streaming video service based on the computed single QoE metric.

2. The computer-implemented method of claim 1, wherein the measure of the level with which the one or more users are engaged with the streaming video service comprises either a measure of hours watched by users of the streaming video service or a level of subscriber retention for the streaming video service.

3. The computer-implemented method of claim 1, wherein at least one of the performance characteristics comprises streaming video startup latency.

4. The computer-implemented method of claim 1, wherein at least one of the performance characteristics comprises initial video quality.

5. The computer-implemented method of claim 1, wherein at least one of the performance characteristics comprises streaming video quality.

6. The computer-implemented method of claim 5, wherein streaming video quality is related to a bit rate at which streaming video is delivered to a user.

7. The computer-implemented method of claim 1, wherein at least one of the performance characteristics comprises at least one of a probability of a buffer under-run occurring, a time required to reach a specified video quality, a duration of rebuffer events, and a distribution of rebuffer events.

8. The computer-implemented method of claim 1, wherein at least one of the performance characteristics relates to how frequently a bit rate at which streaming video is delivered to a client device changes.

9. The computer-implemented method of claim 1, wherein a contribution function correlates different values of the performance characteristic with different numerical contributions to the single QoE metric.

10. The computer-implemented method of claim 1, further comprising:
monitoring the computed single QoE metric while streaming video content to a user; and
upon determining the computed single QoE metric has fallen below a specified threshold, performing one or more corrective actions to improve the computed single QoE metric.

11. The computer-implemented method of claim 1, wherein each weight comprises a value that increases a correlation between the computed single QoE metric and the measure of the level with which the one or more users are engaged with the streaming video service, wherein the computed single QoE metric and the measure of the level with which the one or more users are engaged with the streaming video service are correlated when a high level of the computed single QoE metric corresponds to a high level of the measure of the level with which the one or more users are engaged with the streaming video service.

12. The computer-implemented method of claim 1, further comprising setting one or more configuration settings for the streaming video service for a first connection associated with at least one of a user of a particular class of users, a particular streaming media client device, and a device of a particular class of streaming media client devices, wherein the one or more configuration settings increase a value of the computed single QoE metric for connections that correspond to the first connection.

13. A non-transitory computer-readable storage medium including instructions that, when executed by a processor, cause the processor to perform the steps of:
sampling a plurality of performance characteristics associated with a streaming video service while streaming media content to one or more users;
determining, for each performance characteristic included in the plurality of performance characteristics, a weight corresponding to the performance characteristic;
computing a single quality of experience (QoE) metric by applying, for each performance characteristic included in the plurality of performance characteristics, the weight corresponding to the performance characteristic to a numerical contribution determined for the performance characteristic, wherein each weight is determined to increase a correlation between the single QoE metric and a measure of a level with which the one or more users are engaged with the streaming video service; and
updating at least one configuration setting for the streaming video service based on the computed single QoE metric.

14. The non-transitory computer-readable storage medium of claim 13, wherein the measure of the level with which the one or more users are engaged with the streaming video service comprises either a measure of hours watched by users of the streaming video service or a level of subscriber retention for the streaming video service.

15. The non-transitory computer-readable storage medium of claim 13, wherein at least one of the performance characteristics comprises at least one of streaming video startup latency, initial video quality, average video quality, a time required to reach a specified video quality, a probability of a buffer under-run occurring, how frequently the bit rate at which streaming video is delivered to a client device changes, a duration of rebuffer events, and a distribution of rebuffer events.

16. The non-transitory computer-readable storage medium of claim 13, further comprising, for each performance characteristic included in the plurality of performance characteristics, determining the numerical contribution that the performance characteristic makes to the single QoE metric for the streaming video service, and wherein computing the single QoE metric comprises applying each weight to the numerical contribution that the corresponding performance characteristic makes to the single QoE metric.

17. The non-transitory computer-readable storage medium of claim 13, wherein a contribution function correlates different values of the performance characteristic with different numerical contributions to the single QoE metric.

18. The computer-readable storage medium of claim 13, wherein the computed single QoE metric is determined for a plurality of users assigned to a common user type, for a particular streaming media client device, or for a particular class of streaming media client devices.

19. A system, comprising:
a memory that includes an application;
a processor couple to the memory and, when executing the application, is configured to:
sample a plurality of performance characteristics associated with a streaming video service while streaming media content to one or more users;
determine, for each performance characteristic included in the plurality of performance characteristics, a weight corresponding to the performance characteristic;
compute a single quality of experience (QoE) metric by applying, for each performance characteristic included in the plurality of performance characteristics, the weight corresponding to the performance characteristic to a numerical contribution determined for the performance characteristic, wherein each weight is determined to increase a correlation between the single QoE metric and a measure of a level with which the one or more users are engaged with the streaming video service; and
update at least one configuration setting associated with the streaming video service based on the single QoE metric.

20. The system of claim 19, wherein the measure of the level with which the one or more users are engaged with the streaming video service comprises either a measure of hours watched by users of the streaming video service or a level of subscriber retention for the streaming video service.

21. The system of claim 19, wherein at least one of the performance characteristics comprises at least one of streaming video startup latency, initial video quality, average video quality, a time required to reach a specified video quality, a probability of a buffer under-run occurring, how frequently the bit rate at which streaming video is delivered to a client device changes, a duration of rebuffer events, and a distribution of rebuffer events.

22. The system of claim 19, wherein, for each performance characteristic, a contribution function correlates different values of the performance characteristic with different values of a numerical contribution to the single QoE metric, and at least one of the contribution functions comprises a sigmoid curve function.

23. The system of claim 19, wherein the processor is further configured to, for each performance characteristic included in the plurality of performance characteristics, determine the numerical contribution that the performance characteristic makes to the single QoE metric for the streaming video service, and wherein computing the single QoE metric comprises applying each weight to the numerical contribution that the corresponding performance characteristic makes to the single QoE metric.

* * * * *